US006205133B1

(12) United States Patent
Bexten (10) Patent No.: US 6,205,133 B1
(45) Date of Patent: *Mar. 20, 2001

(54) FLEXIBLE WIDEBAND ARCHITECTURE FOR USE IN RADIO COMMUNICATIONS SYSTEMS

(75) Inventor: Ronald L. Bexten, Cary, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/753,437

(22) Filed: Nov. 25, 1996

(51) Int. Cl.[7] ...................................................... H04J 1/00
(52) U.S. Cl. ............................................. 370/343; 375/219
(58) Field of Search ..................................... 370/326, 328, 370/343, 338, 366, 445, 433, 434, 407, 425; 375/219

(56) References Cited

U.S. PATENT DOCUMENTS

| 4,199,660 | * | 4/1980 | Dill et al. | 370/307 |
| 4,584,690 | * | 4/1986 | Cafiero et al. | 375/290 |
| 5,299,192 | * | 3/1994 | Guo et al. | 370/484 |
| 5,396,543 | * | 3/1995 | Beeson, Jr. et al. | 370/328 |
| 5,535,240 | | 7/1996 | Carney et al. . | |
| 5,537,435 | | 7/1996 | Carney et al. . | |
| 5,537,610 | * | 7/1996 | Mauger et al. | 370/328 |
| 5,640,390 | * | 6/1997 | Sakamoto et al. | 370/346 |
| 5,734,979 | * | 3/1998 | Lu et al. | 370/328 |
| 5,790,529 | * | 8/1998 | Haber | 370/328 |

FOREIGN PATENT DOCUMENTS

| 368 673 | 5/1990 | (EP) . |
| 440 081 A2 | 8/1991 | (EP) . |
| 714218A1 | 5/1996 | (EP) . |
| WO94/28690 | 12/1994 | (WO) . |

OTHER PUBLICATIONS

John R. Doner, "Designing a Broadband Software Radio", *Communication Systems Design*, Nov. 1996.
Koons et al., "Multiprocessing DSPs for Basestation Designs", *Communication Systems Design*, Mar. 1996.
Narasimha et al., "Design of a 24–Channel Transmultiplexer", *IEEE Transactions on Acoustics, Speech, and Signal Processing*, vol. ASSP–27, No. 6, Dec. 1979.
Scheuermann et al., "A Comprehensive Survey of Digital Transmultiplexing Methods", *Proceedings of the IEEE*, vol. 69, No. 11, Nov. 1981.
Bellanger et al., "TDM–FDM Transmultiplexer: Digital Polyphase and FFT", *IEEE Transactions on Communications*, vol. Com–22, No. 9, Sep. 1974.
Vaidyanathan, "Multirate Digital Filters, Filter Banks, Polyphase Networks, and Applications: A Tutorial", *Proceedings of the IEEE*, vol. 78, No. 1, Jan. 1990.

(List continued on next page.)

*Primary Examiner*—Melvin Marcelo
*Assistant Examiner*—Phuongchau Ba Nguyen
(74) *Attorney, Agent, or Firm*—Burns, Doane, Swecker & Mathis, L.L.P.

(57) ABSTRACT

A wideband digital architecture for use in radio communications systems. In an exemplary embodiment, a central hub station is coupled by high speed digital data transports to multiple distributed radio transceivers. The radio transceivers are designed to perform relatively little signal processing, while the central hub is designed to perform computationally intensive signal processing tasks. By exchanging wideband data between the radio transceivers and the hub, by centralizing key system resources at the hub, and by adaptively allocating the system resources in accordance with actual system usage, the radio architecture of the present invention maximizes overall system capacity, flexibility, and resource usage efficiency while minimizing the overall system cost.

20 Claims, 5 Drawing Sheets

OTHER PUBLICATIONS

Ohmoto, Ryutaro et al., "Fiber–Optic Microcell Radio System with a Spectrum Delivery Scheme," IEEE Journal on Selected Areas in Communications 11 (1993), Sep., No. 7, NY, US, pp. 1108–1117.

Wala, Philip M., "A New Microcell Architecture Using Digital Optical Transport," $43^{rd}$ IEEE Vehicular Technology Conference, Secaucus, NY, US, May, 1993, pp. 585–588.

* cited by examiner

FLEXIBLE WIDEBAND ARCHITECTURE FOR USE IN RADIO COMMUNICATIONS SYSTEMS

BACKGROUND

The present invention relates to radio communications and, more particularly, to a distributed wideband architecture for use in radio communications systems.

Today, indoor cellular systems, as well as many small-cell, or pico-cell, outdoor systems, use relatively unintelligent, centralized base stations in conjunction with distributed analog transceivers to transmit and receive communication signals to and from local mobile users operating within the systems. Communication signals are allocated to, and modulated on, frequency division multiplexed (FDM) carriers, or channels, within an overall frequency bandwidth designated for use by the systems. Channel selection and allocation is typically performed using relatively costly, narrowband analog filters located within the analog transceivers or within the base station. The analog filters are tuned to a pre-selected and fixed frequency bandwidth and are capable of supporting only a single air-interface standard. Thus, current systems are inflexible in terms of protocol and, for a given number of transceivers, are limited with respect to the overall number of users which can be simultaneously accommodated in an overall geographic coverage area.

The inflexible nature of current system design also yields fixed user capacity within each single-transceiver coverage area and makes extremely inefficient use of transceiver hardware. As a result, available FDM channels may lie dormant even as potential users are denied access to the system. Empirical data suggest that usage efficiency in these systems is typically less than 30%. Such inefficiency often requires that a large number of analog transceivers be used to obtain only modest system capacity and sometimes leads to overly complex and overly costly base station design. Also, due to the fixed-protocol nature of current systems, system designers must practice careful pre-installation frequency planning and coordination with respect to existing, comparatively powerful, outdoor systems. This can result in high installation and operations costs and may further limit the capacity of the installed system. Thus, there is a real need for an improved radio system architecture.

SUMMARY

The present invention fulfills the above-described and other needs by providing an improved wideband digital architecture which significantly increases overall hardware usage efficiency as compared to conventional systems. The present invention centralizes, shares, and re-uses key system resources, incorporates programmable frequency bandwidths, and adaptively supports a variety of air-interface standards in order to maximize system capacity and flexibility and to minimize the need for careful frequency planning and coordination with respect to existing systems. For example, by monitoring call traffic conditions at multiple distributed radio transceivers, a radio system constructed in accordance with the teachings of the present invention can adaptively allocate what would otherwise be idle system resources to heavy traffic areas on an as needed basis. Additionally, by measuring prevailing signal strengths on available frequency channels, such a radio system can automatically develop a frequency allocation plan which does not conflict with surrounding systems.

In brief, the present invention teaches a digital radio system architecture based on an intelligent wideband radio base station, or hub, controlling streamlined, distributed radio transceivers, or radio heads. The scaled-down radio heads are linked to the central hub station through high speed digital data transports and are designed to perform relatively little signal processing (e.g., multi-carrier RF power amplification, frequency upconversion and downconversion, wideband low-noise amplification, digital-to-analog and analog-to-digital conversion, etc.). The central hub, on the other hand, is designed to perform more computationally intensive signal processing tasks (e.g., signal modulation and demodulation, channel selection and allocation, channel coding and decoding, air-frame synchronization, etc.). By centralizing and adaptively allocating system resources in accordance with actual system usage, the present invention teaches an extremely flexible architecture which combines high system capacity with low overall system cost.

The radio heads are designed to be very small, unobtrusive units which are readily installed, for example, in the ceilings and corners of office buildings, manufacturing facilities, shopping malls, sports arenas, etc. Because the radio heads need perform only minimal signal processing tasks, their cost and overall power consumption is significantly lower as compared to the analog radio transceivers of conventional systems. Additionally, the hub station of the present invention cost effectively consolidates, or pools, many of the required signal processing resources at a single central location. As described below, a resource manager within the hub station can be programmed to dynamically allocate system resources among the radio heads, as necessary, based on changing call traffic conditions. Thus, system usage efficiency is dramatically improved, and tremendous savings in terms of system cost, size, and complexity are possible. These and other features and advantages of the present invention are explained hereinafter with reference to the illustrative examples shown in the accompanying drawings.

DETAILED DESCRIPTION

Figure 1:
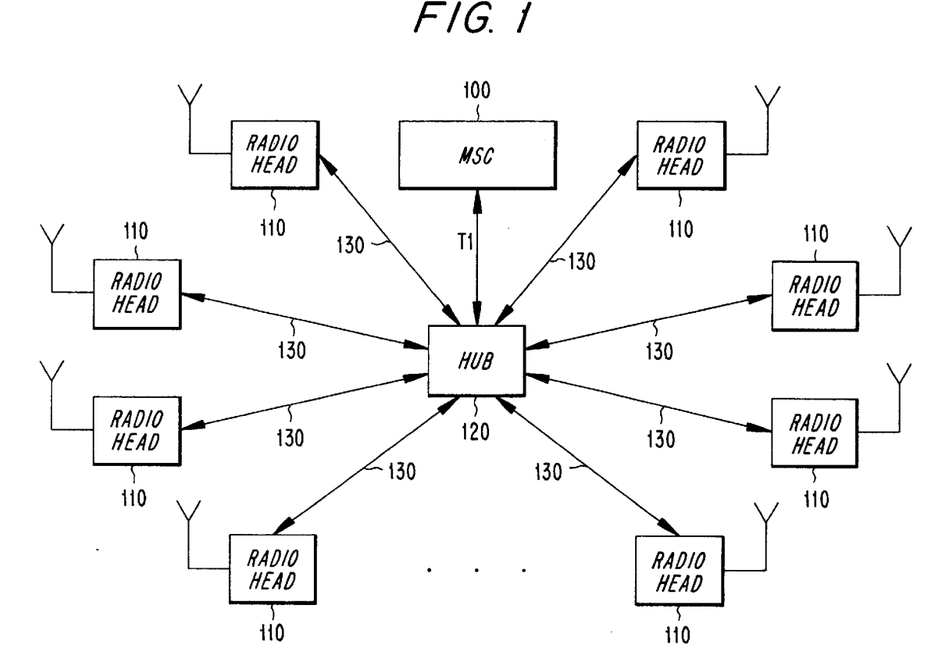
FIG. 1 is a block diagram of an exemplary radio communications system constructed in accordance with the teachings of the present invention.

FIG. 1 depicts a radio system architecture constructed in accordance with the teachings of the present invention. As shown, a central hub station 120 is coupled, through multiple high speed data transports 130, to a number of distributed radio head transceivers 110. The hub station 120 is also coupled, through an industry standard T1 TDM channel, to a mobile switching center (MSC) 100. The MSC is used to connect the local radio system comprising the hub 120 and the radio heads 110 to other communication networks (e.g., the public switched telephone network). Thus, mobile users within the coverage area of the radio heads 110 can communicate with other local users in the same coverage area or with remote users in other networks. The hub station 120 and the radio heads 110 might be used, for example, to provide mobile telephone and pager service within an office building or manufacturing plant.

The radio heads 110 transmit and receive information signals to and from local user mobile stations on multiple FDM carriers lying within a specified frequency band. For example, the U.S. industry standard IS-136 (AMPS/D-AMPS) cellular frequency plan includes 416 30 kHz FDM channels spanning a 12.5 MHz FDM band. Therefore, calls to and from local users are allocated, during system operation, to specific FDM channels. Also, because the MSC communication link typically utilizes a TDM scheme, information signals are translated back and forth between the FDM and TDM formats.

As described above, analogous conventional systems utilize inflexible, analog-type radio transceivers tuned to specific FDM channels. Each such analog transceiver can accommodate only a fixed number of users on a fixed number of FDM channels. Therefore, as system usage fluctuates over time, local users near one transceiver may be denied system access even as available FDM channels, dedicated for use by other transceivers, lie dormant. A common example of usage fluctuation occurs when workers in an office building gather in one confined area, such as a cafeteria or auditorium. In a conventional system, a transceiver located in the common gathering place may be completely idle most of the time, but may not be able to accommodate the periodic spikes in user demand. By way of contrast, the present invention teaches a system which utilizes modern digital technology to adaptively allocate frequency channels across the multiple radio heads 110 of FIG. 1. By pooling critical resources at the hub station 120 of FIG. 1, the system of the present invention is not only highly flexible, but also extremely efficient, and therefore, cost effective.

Figure 2:
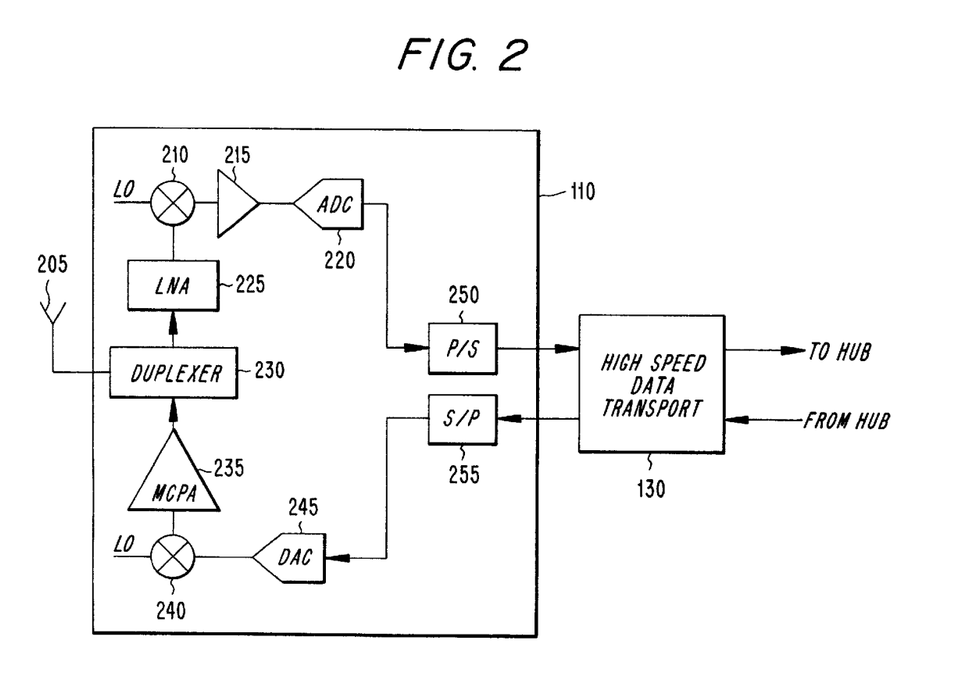
FIG. 2 is a block diagram of an exemplary radio transceiver, or radio head, which may be used, for example, in implementing the system of FIG. 1.

FIG. 2 depicts an exemplary radio head 110 which can be used to implement the system of FIG. 1. As shown, an RF antenna 205 is connected to a duplexer 230 which is in turn connected to a receive, or uplink, signal processing path and a transmit, or downlink, signal processing path. In the uplink signal processing path, the duplexer 230 is coupled to a low-noise amplifier (LNA) 225 which is in turn coupled to an uplink heterodyne mixer 210. The uplink mixer 210 is connected to an amplifier 215 which is in turn connected to an analog-to-digital converter (ADC) 220. The ADC 220 feeds a parallel-to-serial data converter 250 which in turn feeds an input of a high speed data transport 130 connected to the hub station (not shown). In the downlink signal processing path, an output of the high speed data transport 130 is coupled to a serial-to-parallel data converter 255 which is in turn coupled to a digital-to-analog converter (DAC) 245. The DAC 245 feeds a downlink heterodyne mixer 240 which feeds a multi-carrier power amplifier (CPA) 235. An output of the MCPA 235 is connected to an input of the duplexer 230.

During uplink operation, a wideband signal (i.e., a signal including all FDM channels within the overall reserved frequency band) is received at the radio head antenna 205 and amplified at the LNA 225 and the amplifier 215 to a signal level which is appropriate for input to the ADC 220. The uplink mixer 210 is used to downconvert the wideband signal to an intermediate frequency (IF) level. The ADC 220 digitizes the wideband signal and provides the resulting digital samples, through the parallel-to-serial converter 250, to the high speed data transport 130 for transfer to the hub station. During downlink operation, the radio head 110 receives wideband digital carrier samples from the hub station via the high speed data transport 130. The wideband samples are fed through the serial-to-parallel converter 255 and converted to a wideband analog signal at the DAC 245. The wideband, multi-carrier signal is unconverted to an RF frequency level at the downlink mixer 240, amplified at the MCPA 235, and ultimately broadcast at the radio head antenna 205. Note that the duplexer 230 isolates the uplink signal processing path from the antenna 205 during downlink operations and vice versa.

Figure 3:
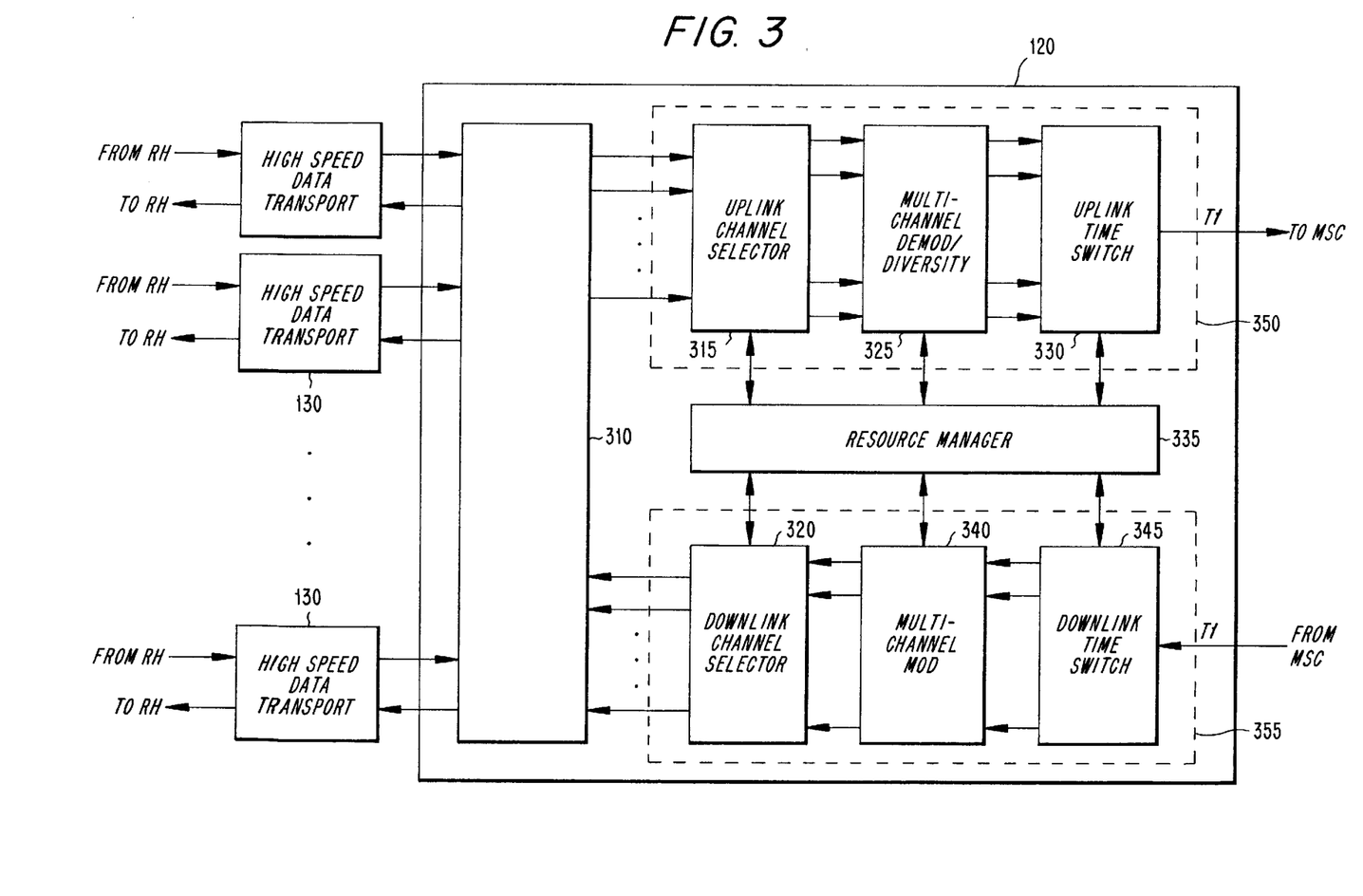
FIG. 3 is a block diagram of an exemplary central hub station which may be used in conjunction with the radio transceiver of FIG. 2 to implement the radio communications system of FIG. 1.

FIG. 3 depicts an exemplary hub station 120 which may be used, for example, in conjunction with radio heads constructed in accordance with FIG. 2 to implement the radio system of FIG. 1. As shown, a series of high speed data transports 130, each connected to a radio head (not shown), are coupled through a connecting block 310 to an uplink channel selector 315 and a downlink channel selector 320. The uplink channel selector 315 is connected to a multi-channel demodulator 325 which is in turn connected to an uplink time switch 330. The uplink time switch 330 is connected to an MSC (not shown). A downlink time switch 345, also connected to the MSC, is coupled to a multi-channel modulator 340 which is in turn coupled to the downlink channel selector 320. A resource manager 335 is connected to the uplink and downlink channel selectors 315, 320, as well as the multi-channel demodulator 325, the multi-channel modulator 340, and the uplink and downlink time switches 330, 345.

During uplink operation, digital wideband FDM signals are received at the hub 120 from the radio heads 110 via the high speed data transports 130, and information signals (e.g., voice signals) are delivered from the hub 120 to the MSC via a standard T1 TDM communication channel. Individual carriers within the wideband signals received from the radio heads 110 are adaptively selected, demodulated, and arranged in TDM format within an uplink channelizer 350 which includes the uplink channel selector 315, the multi-channel demodulator 325, and the uplink time switch 330. As is described in more detail below, precisely which hardware components within the uplink channelizer 350 operate on precisely which individual carriers from precisely which radio heads at any given time is controlled by the resource manager 335.

Conversely, during downlink operation, information signals are received at the hub 120 from the MSC via a standard T1 TDM channel, and digital wideband FDM signals are delivered from the hub 120 to the radio heads 110 via the high speed data transports 130. The information signals received at the hub 120 from the MSC are modulated on digital FDM carriers and selectively delivered to the radio heads 110 by a downlink channelizer 355 made up of the downlink channel selector 320, the multi-channel modulator 340, and the downlink time switch 345. Again, precisely which hardware components within the downlink channelizer 355 operate on precisely which radio head carriers at any given time is controlled by the resource manager 335.

Because the resource manager 335 can monitor system activity and then adaptively and selectively route information signals to and from any and all of the wideband radio heads 110 as appropriate, the radio system of FIG. 3 can easily handle the above described problems associated with continually changing call traffic conditions. Additionally, because the channel allocation, modulation, demodulation, and format conversion functions are collected at the central hub station 120, maximum resource utilization and efficiency can be achieved.

It is important to note here that the components of FIG. 3 are conceptual in nature and are intended primarily to aid understanding of the teachings of the present invention. Practical implementation of the various aspects of FIG. 3 may be accomplished using hardware components that may not correspond one-to-one with the broad functional blocks of FIG. 3. For example, the connecting block 310 situated between the data transports 130 and the uplink and downlink channel selectors 315, 320 is included in FIG. 3 merely to indicate that any information signal received from, or directed to, the MSC can be directed to, or received from, any one of the radio heads 110. As is made clear below, the precise type of connection between the data transports 130 and the uplink and downlink channel selectors 315, 320 will depend upon which of several possible uplink and downlink channelizer embodiments is being implemented. Additionally, though the uplink channelizer 350 of FIG. 3 is shown to include three distinct functional blocks, namely the uplink channel selector 315, the multi-channel demodulator 325, and the uplink time switch 330, actual implementation of the uplink channelizer 350 may result in a blending of functionality across discrete hardware components. The same may be said of the downlink channelizer 355 which is shown in FIG. 3 to include the downlink time switch 345, the multi-channel modulator 340, and the downlink channel selector 320.

The resource manager 335 may be implemented as a stand-alone component, using for example a designated programmable micro-controller, or it may instead be implemented in software running on a processor which is used to otherwise control hub station functionality. Many standard processors available today are well suited for carrying out the tasks associated with the resource manager 335. As is described in more detail below, the resource manager 335 monitors signal levels and interference measurements received from receive signal strength indicators (RSSIs) within the uplink channelizer 350, as well as call traffic messages received from the MSC 100, to assign calls to appropriate channels (i.e., frequency carriers and time slots) within the system and to control non-blocking switches within the uplink and downlink channelizers 350,355 to dynamically allocate signal processing resources as capacity requirements evolve.

Implementation of the high speed data transports 130 of FIG. 3 will depend upon, among other things, the physical separation between the radio heads 110 and the hub station 120. Because wideband digital signals are transferred, data rates in the uplink direction may be as high as 550 mega-bits per second (Mbps), while downlink data rates may be as high as 640 Mbps for current cellular bandwidths. However, several media exist today which can accommodate such high speed data transfer rates. For example, Fiber Channel and Fiber Distributed Data Interface (FDDI) protocols are available at these rates, as are Asynchronous Transfer Mode (ATM) and Synchronous Optical Network/Synchronous Data Hierarchy (SONET/SDH) protocols. While fiber should most likely be used for distances greater than 100 meters, Gigabit Ethernet is often suitable for shorter distances.

Figure 4:
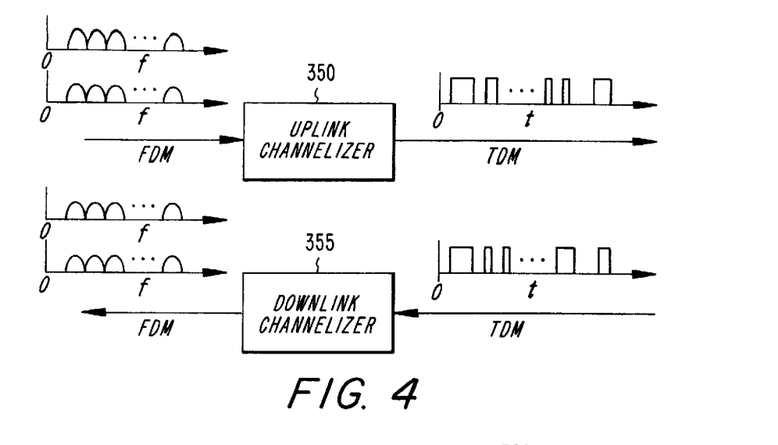
FIG. 4 is a conceptualization of a translation, between frequency division multiplexed (FDM) information signals and corresponding time division multiplexed (TDM) signals, which may be performed, for example, using components located within the embodiments of FIGS. 1–3.

As described below, both the uplink channelizer 350 and the downlink channelizer 355 can be implemented effectively in several different ways. No matter the exact implementation, however, the high-level functionality of the channelizers is as shown in FIG. 4. With respect to the uplink channelizer 350, FIG. 4 indicates that, among multiple wideband FDM signals arriving at the hub station from multiple radio heads, individual information signals are selected, demodulated, and ultimately delivered to an MSC in time-domain format. Conversely, with respect to the downlink channelizer 355, FIG. 4 indicates that individual information signals, arriving at the hub station from an MSC in time-domain format, are modulated and selectively dispersed to the multiple radio heads in wideband FDM format. Those skilled in the art will appreciate that individual FDM carriers within the system may contain a single information signal (e.g., in an AMPS mode) or multiple information signals assigned to interleaved carrier time slots (e.g., in a D-AMPS mode).

Next described are two possible configurations for the uplink channelizer 350. Though only two embodiments are described in detail, those skilled in the art will appreciate that other equivalent configurations are contemplated herein. Additionally, although the embodiments are described specifically with respect to the uplink channelizer 350, analogous embodiments for the downlink channelizer 355 are also contemplated.

Figure 5:
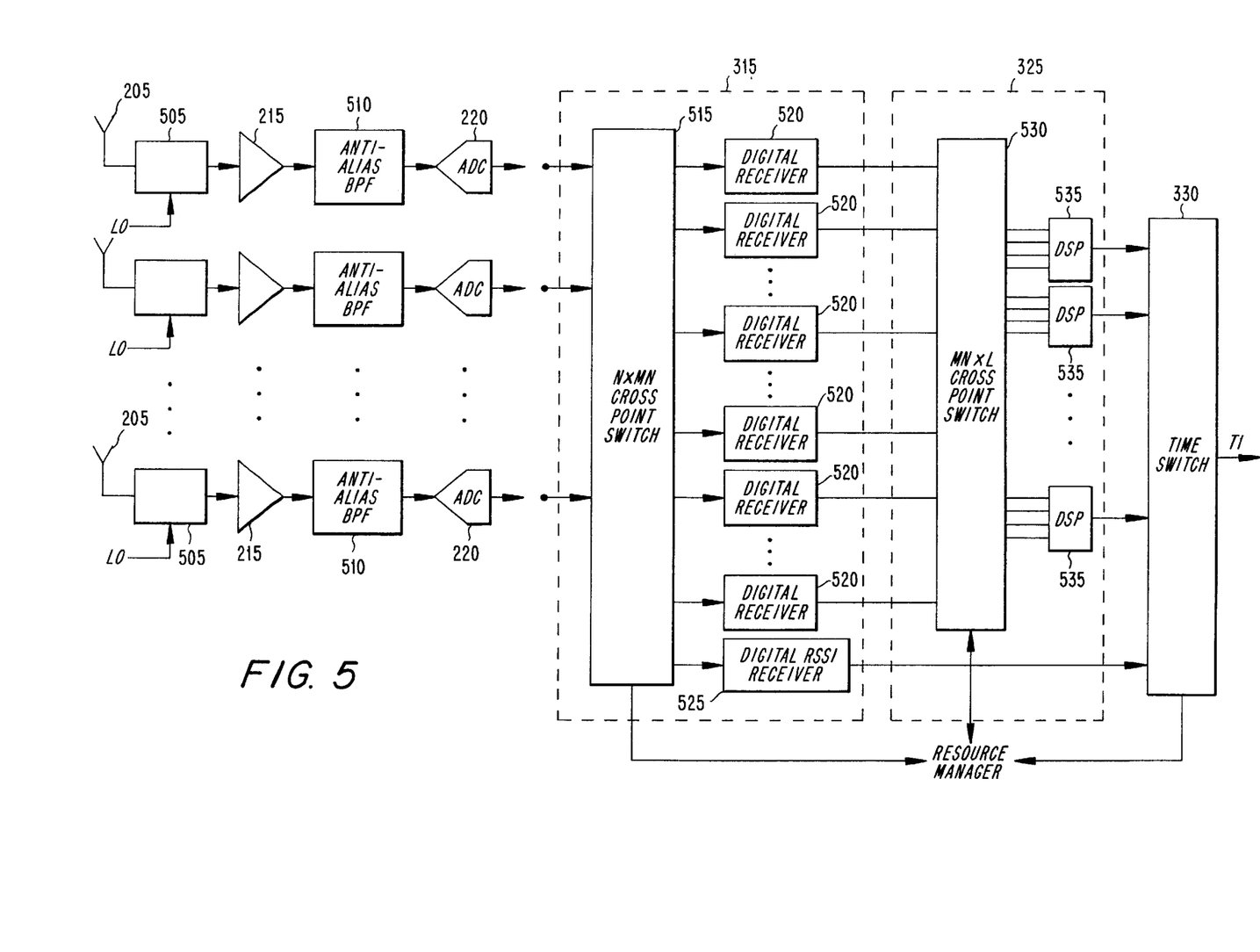
FIG. 5 depicts a first exemplary embodiment of an adaptive signal channelizer which may be used, for example, in the hub station of FIG. 3.

FIG. 5 depicts an uplink channelizer implemented using a bank of digital receivers 520. As shown, multiple radio heads (each depicted as a combination of the radio head uplink components described with respect to FIG. 2) are connected via high speed data transports (not shown) to an uplink channel selector 315 which is in turn connected to a multi-channel demodulator 325. The multi-channel demodulator 325 is coupled to an uplink time switch 330 which is in turn coupled via a T1 communication link to an MSC (not shown). Within the uplink channel selector 315, a primary cross-point switch 515 is connected to a bank of digital receivers 520 and to a digital RSSI unit 525. Additionally, within the multi-channel demodulator 325, a secondary cross-point switch 530 is connected to a bank of digital signal processors 535. The primary cross-point switch 515, the secondary cross-point switch 530, and the uplink time switch 330 are coupled to a resource manager (not shown). Also, although no connection is explicitly shown, it will be understood that the resource manager has access to information output by the RSSI unit 525.

In operation, N digital wideband FDM signals, received from N distributed radio heads, are selectively coupled through the N×(M*N) primary cross-point switch 515 to M*N digital receivers (N and M integers). The primary cross-point switch 515, under control of the resource manager, enables a wideband FDM signal received from any radio head to be coupled to any one, or more, of the N*M digital receivers 520. Note that M represents the nominal, or average, number of digital receivers 520 available per radio head. Advantageously, because the radio heads and the digital receivers 520 are not fixedly coupled, the number of digital receivers 520 can be changed as capacity requirements evolve. In practice, the number M of digital receivers 520 used per radio head is bounded by the number of channels available in the system (e.g., 416 in an IS-136 system). Each digital receiver 520 accepts a time-sampled wideband FDM input and produces a single-carrier output.

Figure 6:
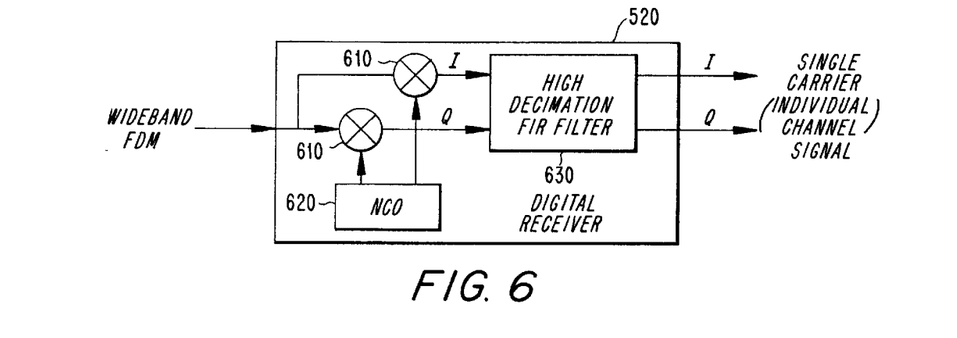
FIG. 6 is a block diagram of a digital receiver which may be used, for example, in constructing the exemplary channelizer of FIG. 5.

An exemplary digital receiver 520 is depicted in FIG. 6. As shown, a digital wideband FDM input is mixed, at mixers 610, with the output of an NCO 620 which is set to downconvert a particular channel within the FDM spectrum to baseband. In-phase (I) and quadrature (Q) components of the down-converted signal, arising at the outputs of the mixers 610 and representing one FDM channel from one radio head, are input to a high-decimation FIR filter 630. The FIR filter 630 removes unwanted images generated during the mixing process and reduces the sample rate from the relatively high wideband FDM rate to one that is more appropriate for the single baseband carrier. The down-sampled I and Q components which are output by the FIR filter 630 can be time multiplexed to form a single sample stream using a parallel-to-serial converter (not shown). Digital receivers 520 such as that shown in FIG. 6 are low cost, widely available, and can be adaptively programmed to select and process any single channel within the FDM spectrum.

As shown in FIG. 5, the M*N outputs from the M*N digital receivers 520 are input to the (M*N)×L secondary cross-point switch 530. The secondary cross-point switch 530, under the control of the resource manager, selectively couples the digital receiver outputs to L digital signal processors (DSPs) 535 (L an integer). The DSPs 535 demodulate the single carrier signals received from the digital receivers 520 and may perform additional signal processing (e.g., channel coding). Demodulated outputs from the DSPs 535 (i.e., time-domain information signals such as voice signals) are input to the uplink time switch 330 where they are TDM formatted for delivery to the MSC.

Again, because the DSPs 535 are not fixedly coupled to the digital receivers 520, the number L of DSPs 535 can be readily changed depending upon system capacity requirements. Also, note that up to four digital receiver outputs may be input to one DSP 535 for purposes of diversity processing. In other words, a signal emitted by one local mobile station can be received at multiple radio heads, and the redundant signals can be combined, for example in a weighted summing operation, to provide an optimized signal. The number of diversity branches (i.e., the number of outputs of the (M*N)×L cross-point switch 530 directed to a single DSP 535) can be adjusted dynamically in accordance with changing traffic demands to achieve "soft" trade-offs between system performance and system capacity.

The embodiment of FIG. 5 allows the hub station to provide flexible capacity per geographic coverage area. Using the primary and secondary cross-point switches 515, 530, the resource manager can dynamically assign the M*N digital receivers 520 and the L DSPs 535 to any of the N geographic coverage areas as traffic densities in those areas change over time. The resource manager can monitor system activity, for example, via the RSSI receiver 525. As known, the RSSI receiver 525 can measure signal level, signal activity, and signal quality. Channels are measured to determine whether a signal is present, and, if so, to assess the strength of the signal and to determine whether the signal is analog or digital, voice or control, valid in the indoor system or originating from an outdoor system, etc. Channels at each radio head can be monitored in cyclic fashion, and the resource manager can process the resulting data to create and maintain a channel status matrix which the resource manager can then use to assign channels when calls are set up.

Because the digital receivers 520 in the embodiment of FIG. 5 are so efficiently utilized, fewer receivers need be employed for given capacity and coverage area requirements as compared to conventional systems. Also, because the digital receivers 520 are easily programmable, the embodiment of FIG. 5 is readily configured to operate in compliance with virtually any air-interface standard (e.g., GSM, DECT, AMPS, D-AMPS, etc.). Therefore, a combination of the embodiments of FIGS. 3 and 5 represents, in many ways, a "universal" hub station. The architecture of FIG. 5 is particularly attractive when a relatively small number of carriers are to be processed (as discussed below, the embodiment of FIG. 7 is, perhaps, more efficient for large numbers of system users).

Again, though the embodiment of FIG. 5 has been described with respect to an uplink channelizer, those skilled in the art will appreciate that an analogous embodiment can be constructed to implement a downlink channelizer. Also, those skilled in the art will appreciate that the present invention encompasses many variations on the embodiment of FIG. 5. For example, it may be desirable in certain contexts to give up some flexibility, in exchange for reduced cost and complexity, by constructing a system similar to the embodiment of FIG. 5, wherein either one or both of the cross-point switches 515, 530 are excluded. Such a system would still provide significant advantages over presently available analog systems.

Figure 7:
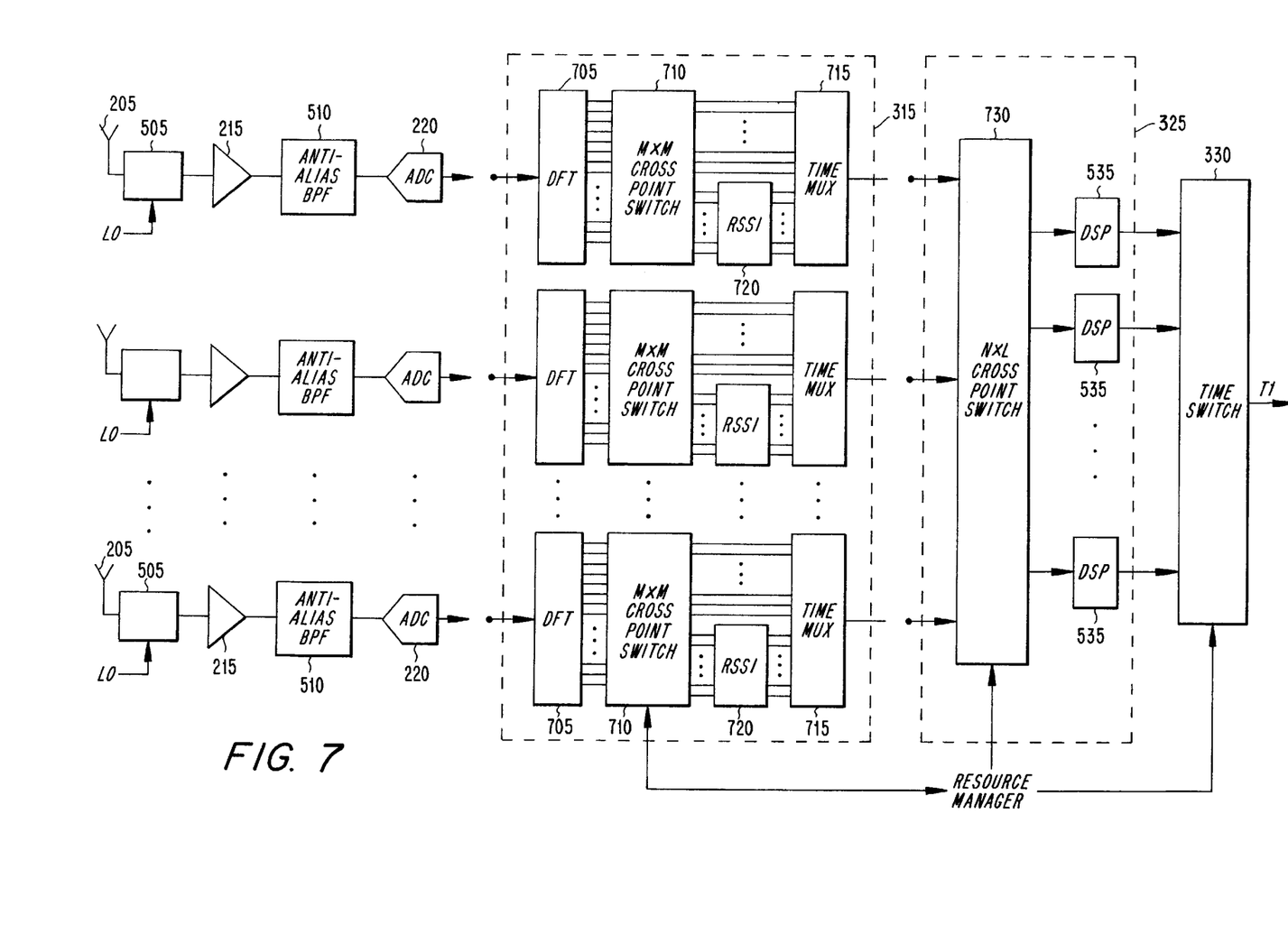
FIG. 7 depicts a second exemplary embodiment of an adaptive signal channelizer which may be used, for example, in the hub station of FIG. 3.

FIG. 7 depicts another embodiment of an uplink channelizer in which the required signal processing is accomplished using a bank of DFT-type multi-channel demultiplexers 705. As shown, multiple radio heads (each depicted as a combination of the radio head uplink components described with respect to FIG. 2) are connected via high speed data transports (not shown) to an uplink channel selector 315 which is in turn connected to a multi-channel demodulator 325. The multi-channel demodulator 325 is coupled to an uplink time switch 330 which is in turn coupled via a T1 communication link to an MSC (not shown).

Within the uplink channel selector 315 there are N signal processing circuits, each circuit corresponding to one of the N radio heads (N an integer). Each circuit includes a DFT demultiplexer 705, an M×M cross-point switch 710 (M an integer), a time multiplexer (MUX) 715, and an RSSI processor 720. Each DFT demultiplexer 705 produces M outputs which are input to the corresponding M×M cross-point switch 710. A subset of the M outputs from each M×M cross-point switch 710 are input to the corresponding time MUX 715 and the remaining outputs from each M×M cross-point switch 710 are input to the corresponding RSSI processor 720.

Within the multi-channel demodulator 325, N outputs produced by the N signal processing circuits are input to an N×L cross-point switch 730, and L outputs from the N×L cross-point switch 730 are input to L DSPs 535. Outputs from the DSPs 535 are input to the uplink time switch 330. As shown, the M×M cross-point switches 710, the N×L cross-point switch 730, and the uplink time switch 330 are connected to a resource manager (not shown). Though, for convenience, only one M×M cross-point switch 710 is shown connected to the resource manager, it will be appreciated that all of the M×M cross-point switches 710 are connected to the resource manager. Also, though the connections are not explicitly shown, it will be understood that the resource manager controls the time MUXes 715 and monitors the RSSIs 720.

In operation, each wideband, multi-carrier FDM signal received from a radio head is translated, as described below, by a DFT demultiplexer 705 to yield the individual channel signals which are received at the radio head. Since each wideband signal contains M carriers (e.g., 416 for typical cellular applications), each DFT demultiplexer 705 produces M individual channel signals. Active radio head channels will contain, for example, one or more local user voice signals, and inactive channels may contain noise or signals picked up from other surrounding systems. The M×M cross point switches 710, under control of the resource manager, then separate the active and non-active channels. Active channels are input directly to the time MUXes 715, and inactive channels are coupled through the RSSI processors 720 to the time MUXes 715. The time MUXes 715 then format the time-domain signals, either as a single TDM signal or as parallel streams of time data, for input to the multi-channel demodulator 325. Signal processing performed at the multi-channel demodulator 325 is similar to that described with respect to the multi-channel demodulator of the embodiment of FIG. 5. Note that, although only one input is shown for each DSP 535, several inputs may actually be coupled to each DSP 535, as is described with respect to FIG. 5, for purposes of diversity processing.

DFT demultiplexers such as those shown in FIG. 7 are described, for example, in M. Bellanger and J. Daguet, "TDM-FDM Transmultiplexer: Digital Polyphase and FFT", *IEEE Transactions on Communications,* September 1974, which is incorporated herein by reference. In brief, a DFT-based demultiplexer translates a wideband FDM signal using a standard DFT algorithm (or a DCT algorithm for purely real signals) to produce corresponding individual channel signals. However, because direct computation of DFTs is numerically intensive and inefficient, DFT demultiplexers are typically implemented in practice using a fast Fourier transform (FFT) algorithm in combination with a polyphase weighting network. Therefore, the DFT blocks 705 of FIG. 7 may be implemented as shown in FIG. 8.

Figure 8:
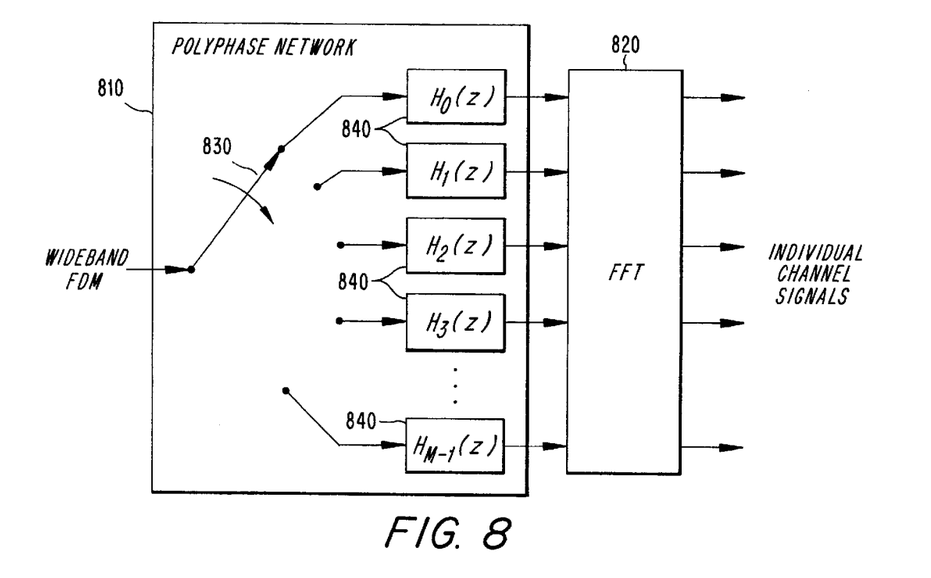
FIG. 8 is a block diagram of an exemplary discrete Fourier transform (DFT) circuit used, for example, in constructing the exemplary channelizer of FIG. 7.

In FIG. 8, a wideband digital FDM signal is input to a switch 830 which alternately connects the FDM signal to multiple weighting blocks 840. Outputs from the weighting blocks are input to an FFT block 820. In operation, the wideband samples input to the switch 830 are multiplied, at the weighting blocks 840, by appropriate weighting coefficients $H_n(z)$ which correspond to taps of a polyphase filter. The resulting weighted samples are processed, as is well known in the art, through an FFT algorithm at the FFT block 820 to produce the desired individual-channel samples. Of course, FIG. 8 is a schematic representation only, and the switching and computational functions are carried out in practice using appropriate DSP hardware.

As with the embodiment of FIG. 5, the embodiment of FIG. 7 enables the hub station to provide flexible capacity per geographic coverage area. Using the cross-point switches 710, 730, the resource manager can dynamically access any channel from any geographic coverage area and adaptively utilize the DSPs 535 as traffic densities change with time. The resource manager can monitor system activity, for example, by monitoring output of the RSSI processors 720 and the DSPs 535 as is described above with respect to FIG. 5.

The embodiment of FIG. 7 is extremely cost efficient in contexts where there are often large numbers of active channels. However, the cost and availability of high speed, wideband FFr processors may make the embodiment of FIG. 5 the preferred choice in contexts involving lower system capacity. Though the embodiment of FIG. 7 has been described with respect to an uplink channelizer, those skilled in the art will appreciate that an analogous embodiment can be constructed to implement a downlink channelizer using IDFT-type multi-channel multiplexers. Also, those skilled in the art will appreciate that the present invention encompasses many variations on the embodiment of FIG. 7. For example, it may be advantageous in certain contexts, from a cost standpoint, to construct a system similar to the embodiment of FIG. 7, but excluding the cross-point switch 730. Additionally, note in FIG. 7 that there are gaps in the connections between the uplink channelizer 315 and the multi-channel demodulator 325. These gaps indicate that the DFT signal processing circuits can be physically located either at the hub station or at the individual radio heads, as appropriate.

In sum, the present invention teaches a highly flexible and efficient wideband radio architecture. Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

What is claimed is:

1. A radio communications system, comprising:
   a plurality of distributed radio transceivers, wherein each of said transceivers includes a wideband radio transmitter for transmitting multiple information signals on multiple frequency channeling multiple system users, and wherein each of said transceivers includes a wideband radio receiver for receiving multiple information signals on multiple frequency channels from the multiple system users;
   a plurality of high speed data transports, each one of said data transports connected to a corresponding one of said transceivers, for carrying wideband signals containing multiple information signals; and
   a hub station, connected to each one of said data transports and exchanging wideband signals with each of one said transceivers, wherein said hub station includes a) a downlink channelizer for coupling information signals received from a mobile switching center to said data transports, b) an uplink channelizer for coupling information signals received at said data transports to the mobile switching center, and c) a resource manager for monitoring system activity and for controlling said downlink channelizer and said uplink channelizer to adaptively allocate and utilize channelizer resources in selecting and processing information signals.

2. The system of claim 1, wherein said system provides radio-communication support for a pico-cell in a cellular radio communications system.

3. The system of claim 1, wherein said system provides radio-communication support for an indoor cell in a cellular radio communications system.

4. The system of claim 1, wherein at least one of said high speed data transports is implemented using a fiber optic link.

5. The system of claim 1, wherein at least one of said high speed data transports is implemented using an ethernet link.

6. A radio transceiver, comprising:
   a wideband radio transmitter for simultaneously transmitting multiple information signals on multiple frequency channels to multiple mobile stations in a radio communications system;
   a wideband radio receiver for simultaneously receiving multiple information signals on multiple frequency channels from the multiple mobile stations in the system,     a high speed data transport interface for exchanging, through a high speed data transport, wideband signals containing multiple information signals with a hub station in the radio communications system; and     an uplink channelizer for converting wideband frequency-division multiplexed signals received at the transceiver to time-division multiplexed signals which are delivered to the hub station.

7. A radio transceiver, comprising:

a wideband radio transmitter for simultaneously transmitting multiple information signals on multiple frequency channels to multiple mobile stations in a radio communications system;

a wideband radio receiver for simultaneously receiving multiple information signals on multiple frequency channels from the multiple mobile stations in the system,     a high speed data transport interface for exchanging, through a high speed data transport, wideband signals containing multiple information signals with a hub station in the radio communications system; and     a downlink channelizer for converting time-division multiplexed signals received from the hub station to wideband frequency-division multiplexed signals which are transmitted to the mobile stations.

8. A hub station, comprising:

a plurality of high speed data transport interfaces for receiving a plurality of wideband uplink signals, each wideband uplink signal containing multiple uplink information signals, from a plurality of distributed radio transceivers and for transmitting a plurality of wideband downlink signals, each wideband downlink signal containing multiple downlink information signals, to the plurality of distributed radio transceivers;

a communication interface for transmitting a formatted uplink signal containing multiple uplink information signals to a mobile switching center and for receiving a formatted downlink signal containing multiple downlink information signals from the mobile switching center;

an uplink channelizer disposed between said high speed data transport interfaces and said communication interface for processing uplink information signals received from the distributed radio transceivers and for arranging selected uplink information signals to form a formatted uplink signal which is delivered to the mobile switching center;

a downlink channelizer disposed between said communication interface and said high speed data transport interfaces for processing downlink information signals received from the mobile switching center and for arranging selected downlink information signals to form a plurality of wideband downlink signals which are delivered to the distributed radio transceivers; and     a resource manager coupled to said uplink and downlink channelizers for monitoring system activity and for controlling said uplink and downlink channelizers to adaptively allocate and utilize channelizer components in selecting, processing, and arranging the uplink and downlink information signals.

9. The hub station of claim 8, wherein the uplink channelizer comprises:

an uplink channel selector for accepting the wideband uplink signals received at said high speed data transport interfaces and for selectively generating, under control of said resource manager, a plurality of single-channel uplink signals, each single-channel uplink signal corresponding to a selected channel within one of the wideband uplink signals;

a multi-channel demodulator coupled to said uplink channel selector for receiving the single-channel uplink signals and for selectively processing the single-channel uplink signals, under control of said resource manager, to produce a plurality of demodulated uplink signals; and     an uplink time switch coupled to said multi-channel demodulator for arranging the demodulated uplink signals, under control of said resource manager, to form a formatted uplink signal which is delivered to the mobile switching center.

10. The hub station of claim 9, wherein said uplink channel selector includes at least one receive signal strength indicator generating output which is used by said resource manager to monitor activity on channels within the wideband uplink signals received from the distributed radio transceivers.

11. The hub station of claim 9, wherein said uplink channel selector comprises:

a plurality of digital receivers, each of said digital receivers accepting a wideband uplink signal and downconverting a selected channel within the wideband uplink signal to produce a single-channel uplink signal which is delivered to said multi-channel demodulator; and     a cross-point switch coupled to said resource manager for selectively directing wideband uplink signals received from the distributed radio transceivers to inputs of said digital receivers.

12. The hub station of claim 9, wherein said uplink channel selector comprises a plurality of processing circuits, each of said processing circuits including a discrete Fourier transform demultiplexer and a cross-point switch which is coupled to said resource manager, wherein each of said processing circuits receives a wideband uplink signal from a distributed radio transceiver and produces, under control of said resource manager, a plurality of single-channel uplink signals which are delivered to said multi-channel demodulator.

13. The hub station of claim 12, wherein each of said processing circuits further comprises a multiplexer for arranging the plurality of single-channel uplink signals generated by the processing circuit to form a time-division multiplexed signal which is delivered to said multi-channel demodulator.

14. The hub station of claim 9, wherein said multi-channel demodulator comprises:

a plurality of digital signal processors, each of said processors processing at least one of the single-channel uplink signals generated by said uplink channel selector to produce a demodulated uplink signal; and     a cross-point switch coupled to said resource manager for selectively directing the single-channel uplink signals received from said uplink channel selector to inputs of said digital signal processors.

15. The hub station of claim 14, wherein each of said processors processes more than one of the single-channel uplink signals generated by said uplink channel selector to provide channel diversity.

16. The hub station of claim 8, wherein the downlink channelizer comprises:

a downlink time switch for accepting a formatted downlink signal from the mobile switching center and for parsing the formatted downlink signal, under control of said resource manager, to produce a plurality of unmodulated downlink signals;

a multi-channel modulator coupled to said downlink time switch for receiving the unmodulated downlink signals and for selectively processing the unmodulated downlink signals, under control of said resource manager, to create a plurality of single-channel downlink signals; and a downlink channel selector coupled to said multi-channel modulator for accepting the single-channel downlink signals and for selectively generating, under control of said resource manager, a plurality of wideband downlink signals which are delivered to the distributed radio transceivers.

17. The hub station of claim 16, wherein said downlink channel selector comprises a bank of digital upconverters, each of said upconverters upconverting a single-channel downlink signal to a selected channel within a wideband downlink signal which is delivered to a distributed radio transceiver.

18. The hub station of claim 16, wherein said downlink channel selector comprises a bank of inverse discrete Fourier transform multiplexers, each of said multiplexers translating a plurality of single-channel downlink signals to form a wideband downlink signal which is delivered to a distributed radio transceiver.

19. A method for conducting radio communications in a system including a centralized hub station and a plurality of distributed radio transceivers, comprising the steps of:

using a plurality of high speed data transports to pass wideband frequency division multiplexed signals, each wideband frequency division multiplexed signal including a number of information signals modulated on a number of carrier frequencies, serially between the hub station and the distributed radio transceivers;

continually measuring system activity; and dynamically allocating, based on said step of measuring, hub station resources in processing and directing the information signals wherein each of the distributed radio transceivers includes a wideband radio transmitter for transmitting multiple information signals on multiple frequency channels to multiple system users and a wideband radio receiver for receiving multiple information signals on multiple frequency channels from the multiple system users, wherein the centralized hub station includes a downlink channelizer for coupling information signals received from a mobile switching center to the data transports and an uplink channelizer for coupling information signals received from the data transports to the mobile switching center, and wherein said step of dynamically allocating hub station resources includes the step of controlling the downlink channelizer and the uplink channelizer in passing information signals between the distributed radio transceivers and the hub station.

20. The method of claim 19, wherein each of the distributed radio transceivers includes a wideband radio transmitter for transmitting multiple information signals on multiple frequency channels to multiple system users and a wideband radio receiver for receiving multiple information signals on multiple frequency channels from the multiple system users, wherein the centralized hub station includes a downlink channelizer for coupling information signals received from a mobile switching center to the data transports and an uplink channelizer for coupling information signals received from the data transports to the mobile switching center, and wherein said step of dynamically allocating hub station resources includes the step of controlling the downlink channelizer and the uplink channelizer in passing information signals between the distributed radio transceivers and the hub station.

* * * * *

UNITED STATES PATENT AND TRADEMARK OFFICE
CERTIFICATE OF CORRECTION

PATENT NO. : 6,205,133 B1
DATED : March 20, 2001
INVENTOR(S) : Ronald L. Bexten

Page 1 of 1

It is certified that error appears in the above-identified patent and that said Letters Patent is hereby corrected as shown below:

Column 10,
Line 28, please delete "channeling" and insert therefor -- channels to --

Signed and Sealed this

Twenty-eighth Day of August, 2001

Attest:

*Nicholas P. Godici*

NICHOLAS P. GODICI
*Acting Director of the United States Patent and Trademark Office*

*Attesting Officer*